(12) United States Patent
Tsai

(10) Patent No.: US 11,896,015 B1
(45) Date of Patent: Feb. 13, 2024

(54) WRAPPING APPARATUS FOR MAKING HANDHELD FOOD

(71) Applicant: MingsBings Inc., Everett, MA (US)

(72) Inventor: Ming Tsai, Natick, MA (US)

(73) Assignee: MingsBings Inc., Everett, MA (US)

(*) Notice: Subject to any disclaimer, the term of this patent is extended or adjusted under 35 U.S.C. 154(b) by 0 days.

(21) Appl. No.: 18/114,163

(22) Filed: Feb. 24, 2023

(51) Int. Cl.
*A21C 9/06* (2006.01)
*A21C 3/02* (2006.01)
*A21C 3/10* (2006.01)
*A21C 3/04* (2006.01)

(52) U.S. Cl.
CPC ............... *A21C 9/063* (2013.01); *A21C 3/02* (2013.01); *A21C 3/04* (2013.01); *A21C 3/10* (2013.01)

(58) Field of Classification Search
CPC ...................................................... A21C 9/063
See application file for complete search history.

(56) References Cited

U.S. PATENT DOCUMENTS

| | | | |
|---|---|---|---|
| 3,633,517 A * | 1/1972 | Kao | A21C 9/04 99/450.6 |
| 3,946,656 A * | 3/1976 | Hai | A21C 15/007 99/450.6 |
| 4,084,493 A * | 4/1978 | Quintana | A21C 9/063 426/94 |
| 4,439,124 A * | 3/1984 | Watanabe | A21C 9/063 425/383 |
| 5,263,407 A * | 11/1993 | Pomara, Jr. | A21C 9/063 99/450.6 |
| 5,289,761 A * | 3/1994 | Spierts | A21D 13/44 99/450.2 |
| 6,170,391 B1 * | 1/2001 | Pomara, Jr. | A21C 9/063 99/450.2 |
| 2012/0152130 A1 * | 6/2012 | Robert | A21C 9/063 99/450.7 |
| 2022/0346386 A1 * | 11/2022 | Zhang | A23P 20/20 |

FOREIGN PATENT DOCUMENTS

CN        113243404 A  *  8/2021  .............. A21C 9/063

* cited by examiner

*Primary Examiner* — John J Norton
(74) *Attorney, Agent, or Firm* — Brownstein Hyatt Farber Schreck LLP

(57) ABSTRACT

An apparatus for making a wrapped food product includes a conveyor under continuous motion. A wrapper is positioned over the moving conveyor. The apparatus includes a filling mechanism that conveys a filling from a hopper to a mold and a piston that pushes the filling from the mold to the wrapper. The apparatus also includes a folding mechanism that folds a side of the wrapper over a portion of the filling, and a second plate that folds the other side of the wrapper over another portion of the filling. A stamper is positioned over the conveyor, pressing the folded wrapper onto the filling. A flipping mechanism of the apparatus includes a set of guide plates and a prong that rotates the filling and a portion of the wrapper around the filling on itself.

19 Claims, 17 Drawing Sheets

US 11,896,015 B1

WRAPPING APPARATUS FOR MAKING HANDHELD FOOD

TECHNICAL FIELD

Apparatuses for making a wrapped food product. In particular, embodiments described herein relate to methods and apparatuses for continuously wrapping a wrapper over a filling to create a wrapped food product.

BACKGROUND

Conventional wrapped foods, such as burritos, empanadas, raviolis, pot stickers, tequeños, calzones, and so on, are a convenient way to enjoy food on the go. Each of these wrapped food products can have a variety of fillings and a variety of filling-to-wrapper ratios. However, making these wrapped foods can be time consuming and is often a manual process. Traditional food wrapping machines generally have bottlenecks in the process due to the time necessary to wrap or roll a filling in a wrapper, whether by hand or in an automated system. Many automated systems waste a large amount of filling to achieve a fast wrapping process.

SUMMARY

An apparatus for making a wrapped food product includes a conveyor under continuous motion with a wrapper positioned over the conveyor. The apparatus has a filling mechanism with an extruder that conveys a filling from a hopper to a mold and a piston that pushes the filling from the mold to the wrapper. The apparatus also includes a folding mechanism with a first plate positioned along a first side of the conveyor, the first plate folds a first side of the wrapper over a first portion of the filling; and a second plate positioned along a second side of the conveyor, the second plate folds a second side of the wrapper over a second portion of the filling. The apparatus has a stamper positioned over the conveyor that presses the folded wrapper onto the filling. In addition, a flipping mechanism has a set of guide plates that aligns the first side and the second side of the folded wrapper with the conveyor, and a prong positioned under the conveyor in a first configuration that rotates the filling and a portion of the wrapper around the filling on itself in a second configuration.

The apparatus can also include a drum having an extruder that extrudes a dough product and a heating element that cooks the dough product as a contiguous sheet of dough, and a cutter that forms wrappers from the contiguous sheet of dough. In some embodiments, in response to a first position of the wrapper, the set of guide plates moves towards the conveyor and in a direction of movement of the conveyor to abut the wrapper. In response to a second position of the wrapper, the set of guide plates moves away from the conveyor and in a direction opposite the movement of the conveyor. The apparatus can also include an optical sensor that detects the first position of the wrapper.

In some examples, the apparatus has a first mister, positioned upstream of the folding mechanism that sprays a liquid over the wrapper, and a second mister, positioned upstream of the flipping mechanism that sprays the liquid over the folded wrapper. In some cases, the mold receives the filling at a first position away from the conveyor and moves over the conveyor and under the piston in a second position. The apparatus can include at least one optical sensor communicatively coupled to a control system, and the folding mechanism engages in response to a signal from the at least one optical sensor.

An apparatus for making a wrapped food item having a filling wrapped in an edible wrapper includes, in some examples, a conveyor that transports a wrapper, a filling extruder that positions an edible filling onto the wrapper, a first folding mechanism that folds a first side of the wrapper in a direction of the filling, a second folding mechanism, that folds a second side of the wrapper over a portion of the first side of the wrapper and in the direction of the filling, and a first stamping mechanism that presses the folded first side of the wrapper and the folded second side of the wrapped against the filling. In some examples, the apparatus has a first flipping mechanism with a first guide plate positioned along a first side of the conveyor, a second guide plate positioned along a second side of the conveyor; where the first guide plate and the second guide plate align the stamped food product, and a first prong positioned under the conveyor, where the first prong pops up from the conveyor to rotate the stamped food product from a leading edge to a trailing edge in a direction opposite the movement of the conveyor and retracts from the conveyor surface after rotation. A second flipping mechanism includes a third guide plate positioned along the first side of the conveyor, a fourth guide plate positioned along the second side of the conveyor; where the third guide plate and the fourth guide plate align the stamped food product, and a second prong positioned within the conveyor, where the second prong pops up from the conveyor to rotate the food product from the leading edge to the trailing edge in the direction opposite the movement of the conveyor and retracts from the conveyor surface after rotation. Also, some apparatuses include a second stamping mechanism that presses the leading edge and the trailing edge against the filling.

In some embodiments, the apparatus has an extruder that forms a thin film of a dough onto the conveyor, a heating element that cooks the dough, and a cutter that cuts the cooked dough into wrappers. In other examples, the apparatus has a bar positioned over the conveyor, where the cooked dough passes from the conveyor, over the bar, and back to the conveyor. The apparatus can include an optical sensor that detects the wrapper at a first station. In response to the wrapper detected at the first station, the filling extruder positions the filling over the wrapper. In response to the wrapper not detected at the first station, the filling extruder suppresses a positioning motion. In some cases, the apparatus has a second optical sensor that detects the wrapper at a second station and, in response to the wrapper detected at the second station, engages the first folding mechanism after a predetermined time based at least in part on a speed of the conveyor.

In some embodiments, the conveyor is under continuous motion.

In some embodiments, the first guide plate has a first guiding pin and the second guide plate has a second guiding pin. Also, the first guide plate abuts the first side of the filling and the second guide plate abuts the second side of the filling. Each first guiding pin and second guiding pin abuts a back side of the filling. In some cases, the first guide plate and the second guide plate are communicatively coupled to a control system and, in response to a signal comprising a position of the wrapper, the first guide plate and the second guide plate move laterally and abut the wrapper.

A method for wrapping a food product includes the following steps: extruding, onto a wrapper, a filling having a predetermined shape and positioned on a portion of the wrapper within a conveyor; folding, over a first portion of the filling, a first side of the wrapper; folding, over a second portion of the filling and over a portion of the folded wrapper, a second side of the wrapper; pressing a leading portion of the wrapper and a trailing portion of the wrapper around a height of the filling; flipping, in a direction opposite the movement of the conveyor, the filling and the leading portion of the wrapper over the trailing portion of the wrapper; flipping, in a direction opposite the movement of the conveyor, the filling over the trailing portion of the wrapper and over the leading portion of the wrapper; and compressing the trailing portion, the leading portion, and the filling.

The method for wrapping food can also include: forming, from cooked dough, the wrapper; and positioning a central portion of the wrapper on the conveyor. In some embodiments, the method aligns, during flipping, the folded wrapper between two guide plates, the guide plates positioned on opposite sides of the conveyor. In other examples, the method includes sensing, using optical sensors, the position of the wrapper at a first station and, in response to the sensing of the position of the wrapper, moving the guide plates to the wrapper. The method can include hydrating, prior to folding, the wrapper over the conveyor and hydrating, prior to flipping, the wrapper over the conveyor.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
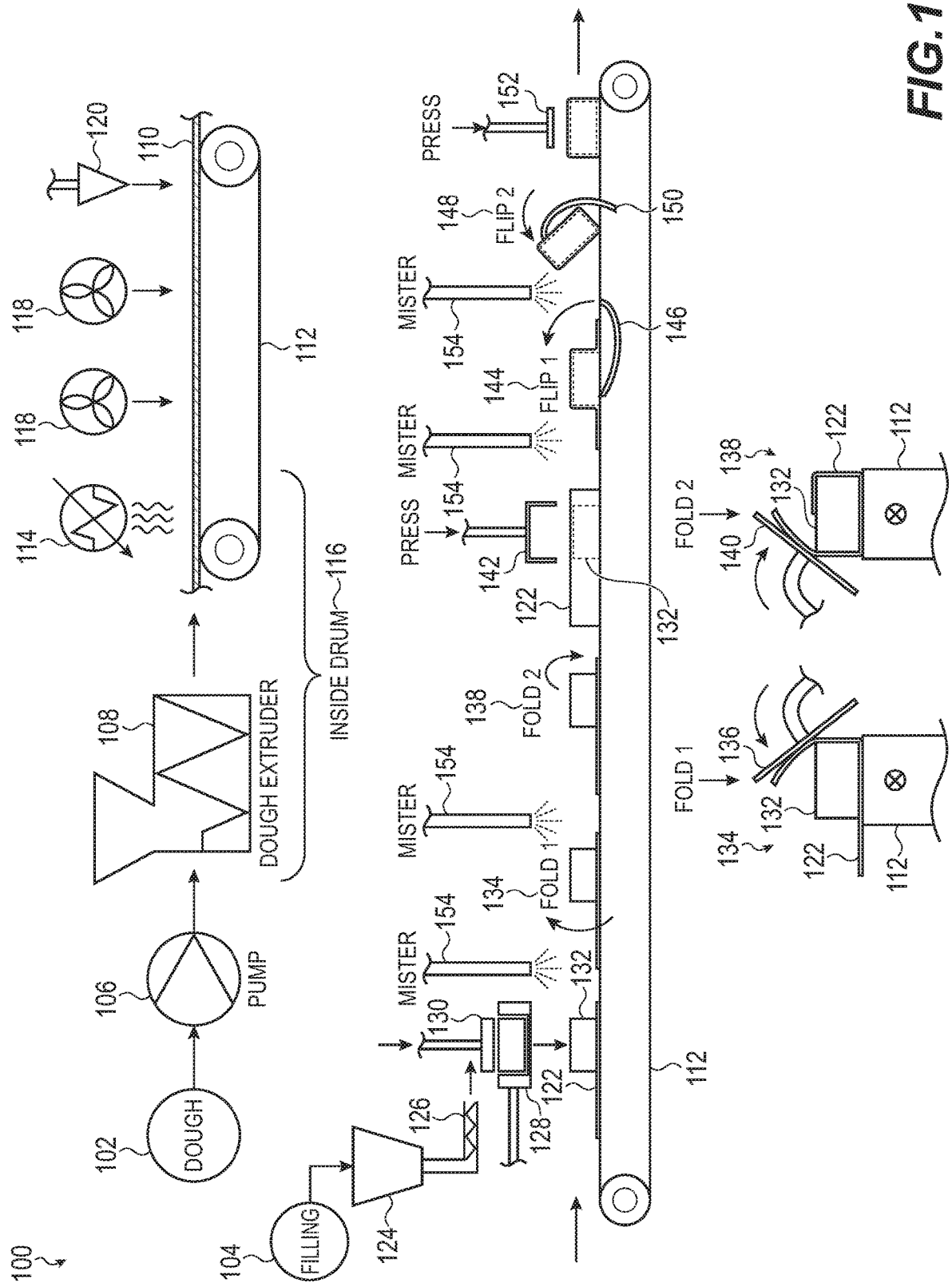
FIG. 1 depicts a schematic of an apparatus for making a wrapped food product, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to apparatuses and processes for making a wrapped food product. The apparatuses described in this application include a conveyor that continuously moves a filling and a wrapper throughout stations to make the wrapped food product.

Many wrapped foods, such as empanadas, calzones, and burritos, are made using manual processes or semi-automated processes. These processes often require shaping the dough to a particular shape, like a circle, rectangle, or square. Fillings, such as cheese, beans, meat, chicken, and so on, are placed on the center of the shaped dough and the dough is then folded to cover the filling. The excess dough on the periphery (e.g., the dough that does not cover the filling) is then cut and separated from the filling (e.g., using a bowl to round the edges to impart a semi-circular shape). This process, whether manual or automated, often results in waste of the excess dough. When this excess dough is recycled, it requires kneading the dough again and/or reshaping the dough into the shape.

Other food products that are wrapped using traditional apparatuses require frequent stopping of the food product while the product is being wrapped. Stopping the food product in these traditional apparatuses helps prevent the filling from flying out while it is being wrapped and helps control of the position of the food product at each station. For example, commercially available machines for wrapping burritos move the filling and tortilla through different stations. The unwrapped filling and tortilla stop at each station to roll the tortilla around the filling. These traditional machines can be inefficient due to the frequent stoppage. Also, because of the rolling process, the burrito can come apart because the tortilla does not adhere to itself or seal the filling within.

Other food products, such as food pockets, have excessive dough and an average user has to take several bites to reach the filling. Pockets are not associated with a healthy lifestyle and do not maximize the amount of filling in a food product. These pocket food products may use traditional doughs, which cannot be consumed by those with certain food allergies.

An apparatus for wrapping a food product, such as described herein, uses a continuously-moving conveyor system. The resulting food product has a large filling-to-wrapper-ratio that allows a consumer to enjoy more of the filling of the product per bite. The wrapped food product described herein can use a wide variety of doughs to create a wrapper. For example, a brown rice flour base may be used to provide an alternative to consumers with certain food allergies, such as dairy. The wrapper used can also be a thin wrapper, which can produce a crunchier food product. The apparatus reduces the need for a human operator during the wrapping, which in turn reduces the potential for work-related injuries.

One example of the apparatus is a conveyor that carries a wrapper and a filling across several stations which fold, press, and flip the food product without stopping the conveyor, or by stopping the belt for very short periods of time during which multiple operations are carried out on multiple products substantially simultaneously. The functioning of the apparatus under the continuous motion of the conveyor is achieved through a set of rapidly moving stations that perform a wrapping function without disturbing the movement of the conveyor and without holding the food product. In some embodiments, each of the stations receive position information for the filling, the wrapper, or the combined filling and wrapper relative to a station, mechanism operating at a station, along a conveyor, or the like using optical sensors which, in turn, send signals to coordinate and/or engage each of the mechanisms. The optical sensors, in some examples, are accurate in the order of millimeters to ensure a precise timing of the mechanisms. In addition, the apparatus includes features such as guides that center the food product, further confirming the position of the product. As a result, the apparatus described herein can make a consistent wrapped food product having a unique wrapping.

In some embodiments, the apparatus accepts two inputs: the dough mixture and the filling. The dough is pumped into a tank or container at one end of the apparatus. That dough mixture is extruded onto the conveyor and cooks rapidly to form the wrapper. The dough mixture cooks as the belt moves around the drum. While, in some embodiments, the apparatus receives the dough mixture, in alternative embodiments, the apparatus receives cooked dough (for example, in the form of a cooked sheet) or pre-cut wrappers instead. In embodiments where the dough mixture is used, the cooked dough comes out of the drum, after cooking, as a contiguous sheet (e.g., not chopped into wrappers). The sheet passes under a pair of dryers that use air and heat to remove moisture. In some cases, the cooked sheet passes over bars positioned over the conveyor that separate the cooked sheet from the conveyor to prevent the cooked sheet from sticking to the conveyor. To make the wrapper, a cutter cuts the sheet into a predetermined shape (e.g., a square, a rectangle, a triangle, an oval, and so on).

At the filling station, the filling is pushed from a hopper through a curved pipe and extruded at the front end onto a mold. Each wrapper passes beneath the mold and a press or piston pushes the shaped filling onto the wrapper. In some examples, the filling is extruded on the front half of the wrapper. Some molds move from the outlet of the pipe to the press positioned over the conveyor. This positioning prevents spilling of the filling onto the conveyor as the filling is extruded.

In some embodiments, the apparatus incorporates two folding mechanisms, a stamping mechanism located after the folding mechanism, two flipping mechanisms, and another stamping mechanism located after the flipping mechanisms. The first folding mechanism folds the right side of the wrapper over the filling. The folding mechanism includes a plate that is flush with a side surface when retracted and that rotates upwards to fold the wrapper. After the filling station, the conveyor carries the wrapper but only a central portion of the wrapper is on the conveyor. In some examples, the wrapper has two sides that protrude from the conveyor and slide over the plate which moves upwards to fold the wrapper without impacting the movement of the filling or the conveyor. The second folding mechanism operates as a mirror opposite of the first folding mechanism, folding the opposite side of the wrapper as it passes over the plate. After the wrapper passes through the first and the second folding mechanisms, the top portion of the filling (e.g., opposite the conveyor) is covered by the wrapper. Before each folding station, misters moisten the wrapper, allowing it to stick to itself. Thus, the overlapping portions of the wrapper at this point are at least partially adhered to each other. The misters also provide more structural integrity to the wrapper by ensuring the wrapper does not dry out, which prevents cracking and/or breaking.

After the sides are folded, a stamper presses the wrapper down around the filling. Once the wrapper is pressed, a small leading edge of the wrapper is pressed to an under layer of the wrapper at the front of the filling. The stamper also presses the wrapper into itself at a rear of the filling leaving a trailing edge at the back of the food product that is larger than the leading edge. Each side of the wrapper that is pressed around the filling creates a seal that secures the filling within the wrapper and initiates the crease for later flips.

Following the stamper, there are two flipping stations. Each station flips the filling backwards onto the trailing portion of the wrapper. The flipping stations have guide plates that properly align the food product before it is flipped. By aligning the product, food waste is reduced and it makes a more uniform food product. For example, without alignment, the filling can be prone to scatter and break the wrapper when flipped. The food product passes between the guide plates for alignment and then a claw-like set of prongs rise upward from the middle of the conveyor through spaces defined between the conveyors. For example, the conveyor has several belts coupled to the same roller system, where each belt is separated from another belt by a gap or space from which the flipping prong or set of prongs can emerge. In some embodiments, the prongs are beneath the surface of the conveyor when the station is not actively flipping a food product (e.g., when the prongs are at rest). As the food product travels with the conveyor, the prongs rotate upward exposing a portion of the prongs above the conveyor. The food product impacts the inner surface of this portion of the prongs. This contact secures the food product during the flip such that the food product does not move unexpectedly or shift with respect to the prong. The prongs then continue to rotate upwards with the food product. The inside surface of the food product shifts with respect to the food product as it flips. The prongs slide from the leading edge of the product to the top portion of the filling. As the prongs continue to rotate, the filling is flipped backwards at which point the prongs rapidly retract without impacting the motion of the product as it moves along the conveyor.

At the second flipping station, the filling is flipped again towards the remaining trailing portion of the wrapper by a second set of prongs. After the food product is flipped, the wrapper is folded under the filling, without protruding portions at the front, back, or at the sides of the food product. In some embodiments, the flipping stations operate simultaneously. For example, two sets of prongs flip two separate food products simultaneously as the food products move along the conveyor.

After flipping, a second stamper compacts the folded food product. For example, the stamper is a press that seals the wrapper "tail" to the wrapper adjacent the filling (e.g., the part flipped backwards). The stamper also compacts the filling to ensure the food product is the proper size and shape.

These foregoing and other embodiments are discussed below with reference to FIGS. 1-10B. However, those skilled in the art will readily appreciate that the detailed description given herein with respect to these figures is for explanation only and should not be construed as limiting.

FIG. 1 shows a schematic of an apparatus 100 for making a wrapped food product. The apparatus has a conveyor that continuously moves a food product across multiple stations to create a wrapped food product. The disclosed apparatus 100 has discrete stations that fill, fold, flip, or press a food product without stopping the conveyor as the food product reaches each station. As a result, the apparatus produces a uniquely wrapped food product efficiently and quickly. The wrapping apparatus 100 reduces food waste by folding the wrapper into itself. Each of the folding and flipping mechanisms cooperate to keep the filling within the wrapper, thus reducing food waste.

In some embodiments, the food wrapping apparatus 100 takes in the dough mixture 102 and a filling 104. Initially, the dough mixture may be liquid, uncooked dough. A pump 106 conveys the raw dough mixture 102 from a tank or a storage container to a dough extruder 108.

The pump 106 can be any suitable pump that transfers the raw dough from a tank to the extruder, such as a positive displacement pump. While a pump is shown, other alternatives are envisioned. For example, a container for the dough can be positioned above the extruder such that the dough flows to the dough extruder due to gravity. While the pump 106 and the dough extruder 108 are shown as distinct mechanisms, some embodiments include a dough extruder with a built-in pump for feeding the extruder.

The dough extruder 108 flattens the raw dough into a thin and contiguous sheet 110 and feeds that sheet into a conveyor 112. The dough extruder 108 uses rollers to roll the raw dough into the conveyor. For example, the dough extruder 108 uses a series of rollers with different separations that makes the consistent and contiguous sheet of dough 110. In other examples, the dough extruder 108 pours the raw dough into the conveyor which uses a plate to shape the thin sheet. The resulting contiguous sheet 110 has a uniform thickness and width.

Once the contiguous sheet 110 is on the conveyor 112, a heater mechanism 114 cooks the dough. For example, the heater mechanism includes heating elements positioned over the dough that cooks the dough through radiation as it moves in the conveyor. In other examples, the heater mechanism is an oven that maintains an inside temperature to cook the dough. As the conveyor moves through the oven, the dough cooks. In other examples, the heater mechanism circulates hot air to cook the dough. As used herein, cooked dough refers to dough in a solid state that can, at least partially, maintain its shape when folded and/or manipulated. Cooked dough can refer to partially-cooked or fully-cooked dough.

Once the dough cooks, some embodiments of the apparatus include bars that temporarily separate the cooked dough sheet from the conveyor to prevent sticking of the cooked dough to the conveyor. These bars can further cool the cooked dough.

In some embodiments, the dough extruder 108 and the heater mechanism 114 are part of a drum 116. The drum 116 maintains heat within equipment to cook the dough, thus reducing the heat loss to the environment and enclosing the raw dough, possibly preventing cross contamination.

Some configurations of the apparatus include fans 118 that cool the cooked dough sheet. These fans 118 help remove moisture from the dough and accelerate cooling of the dough to prevent overcooking from residual heat. The fans 118 collaborate with the bars to draw out moisture and prevent sticking of the cooked dough sheet to the conveyor 112. In some examples, the apparatus has a series of fans positioned over the conveyor. The fans blow cooler air towards the conveyor 112 to cool the cooked sheet.

Some embodiments include a cutter 120 that cuts the contiguous sheet into wrappers 122. The cutter 120 can include any mechanism, such as a blade, a thin sheet, and so on, that can cut the cooked dough into wrappers. In some examples, the cutter is connected to a control system. The control system uses the speed of the conveyor as an input to set or control the speed of the cutter (e.g., cuts per minute of the cutter). In other examples, the cutter utilizes a timer that resets once a cut is performed. Regardless of the control system, the dimensions of the wrappers are generally consistent. For example, the cutter 120 cuts the wrappers within a 1 mm tolerance, a 5 mm tolerance, a 1 cm tolerance, or any other tolerance that allows subsequent stations of the apparatus to manipulate the wrapper. The resulting wrappers can be squares, rectangles, triangles, circles, or any other suitable shape for wrapping. Then each of the wrappers is separated from each other as the wrappers are cut and placed on the conveyor 112. The cut wrappers 122 continue moving along the conveyor 112 to subsequent stations.

While the apparatus 100 described above uses raw dough to make wrappers, the apparatus can receive, as an alternative, pre-made wrappers. In this example, the pre-made wrappers are fed onto the conveyor 112. The apparatus can include guide plates that center the wrapper on the conveyor 112. As explained above, the pre-made wrapper can be cooked or partially-cooked.

In some examples, the apparatus 100 centers the wrappers 122 on the conveyor 112. The conveyor 112 may have varying widths depending on the station of the apparatus. For example, prior to the cutting the cooked dough into the wrappers, the conveyor's width is larger than the width of the cooked dough sheet. As the wrappers 122 move to subsequent stations, for example the filling, folding, and flipping stations, the width of the conveyor is less than the width of the wrapper. As such, the peripheral side portions of the wrapper slide over fixed surfaces. In some examples, the fixed surfaces are flush and smooth to prevent the wrapper from catching with the fixed surfaces. The dimensions of the belt and the wrapper, as explained below, facilitate wrapping the food product. Some embodiments, however, may use a conveyor with a fixed-width belt or belts along its entire length.

At the filling station, the filling 104 is positioned on top of the wrapper 122. To position the filling 104, an extruder 126 pushes the filling from a hopper 124 to a mold 128 and then the filling is pressed out of the mold 128 onto the wrapper 122 on the conveyor 112. In more detail, the apparatus 100 includes a hopper 124 and an extruder 126. The hopper 124 contains filling 104. The extruder 126 pushes the filling from the hopper to a mold 128. In some cases, the extruder 126 has a screw-type mechanism that turns continuously to move the filling from the hopper, through a pipe, and into the mold 128. The extruder 126 exerts enough force on the extruder such that the filling 104 fills the mold 128 without gaps. The mold 128 can be any suitable shape and size and the filling will generally take the shape of the mold cavity. For example, some molds have a square cross section and form a cuboid. In other examples, the mold has a circular cross section and forms a cylinder.

In some examples, the mold 128 moves between the filling tube and the conveyor 112. At the first position of the mold (e.g., when the mold is at the filling tube), as explained above, the mold is filled. At the second position of the mold (e.g., when the mold is at the conveyor), a press 130 pushes the shaped filling 132 from the mold 128 onto the wrapper 122. The press 130 fits within the inside walls of the mold such that the shaped filling 132 can be pushed out uniformly from the mold 128 onto the wrapper 122. For example, a mold that forms a cuboid filling has a corresponding square press shape that matches the inside profile of the mold. As the press 130 lowers into the mold, the shaped filling 132 falls onto the moving wrapper 122. As explained above, the conveyor does not stop or slow down during this process. Once the press is retrieved, the mold is brought back to the first position (e.g., under the filling tube). Any suitable mechanism that moves the mold from the first position to the second position can be used. For example, the mold can have a piston that moves the mold in a horizontal direction (towards and away from the conveyor), and/or it can have a motor, a set of rails, a spring system, and so on.

The filling mechanism is connected to a control system, in some embodiments. The control system includes sensors and other feedback that ensure that filling is consistently positioned on the same location (within a tolerance) of each wrapper. For example, the filling station includes an optical sensor that detects the position of the wrapper as it passes a marker. In some embodiments, the control system calculates the travel time from the marker to the filling position and coordinates when the press is engaged to ensure accurate placement of the filling. In other examples, the press and mold utilize a timer that correlates the speed of the conveyor and the expected separation between adjacent wrappers. In this example, an optical sensor may confirm that a wrapper is positioned on the conveyor beneath the mold prior to extrusion of the filling. If a wrapper is not detected by the sensor, the control system sends a signal to skip placing the filling on the timed instance.

Once the shaped filling 132 is positioned on top the wrapper 122, the food product continues to the first folding station. At the first folding station, a folding mechanism 136 folds a side of the wrapper 122 over a portion of the shaped filling 132, as shown in detail 134. The folding mechanism 136, as explained in more detail in FIGS. 5A-5D, includes a pivoting plate. In the retrieved position, the pivoting plate is flush with the fixed surface. When the plate rotates upwards, it causes the side of the wrapper to lift and fold over the filling. The wrapper folds from the edge of the filling, located close to the edge of the conveyor, such that when the plate rotates, the filling closely abuts the walls of the filling, as shown in the figure.

At the second folding station, the apparatus includes a similar folding mechanism as the first folding station. The second folding station 138 folds the opposite side of the wrapper over a portion of the shaped filling 132 and over a portion of the folded wrapper 122. The second folding station 138 has a folding mechanism 140 that rotates with respect to an edge closest to the conveyor in a clockwise direction, in some embodiments. The motion causes the second side of the wrapper to lift from the edge of the filling and to fold over the top of the food product. As explained above, the first folding station and the second folding station operating on the food product do not slow down or stop the conveyor.

Some examples of the folding stations have optical sensor(s) that detect the position of the wrapper, the position of the filling, or a combination thereof. The sensors send a signal to the control system and/or to the folding mechanisms 136 and 140 when the food product is sensed, causing the folding mechanisms to lift up when the wrapper and/or the filling are passing through the station. Some folding mechanisms are larger than the length of the wrapper to support the entire length of the wrapper as it is folded. Some embodiments of the control system take into account the speed of the conveyor, the speed of the folding mechanism, possible lags between the sensors and the control system, and so on.

At the first stamper station, a stamper 142 presses the sides (front and back) of the folded wrapper onto the filling 132. In some examples, the stamper presses the folded portions of the wrapper tight around the filling. As a result, the wrapper is pressed onto itself. By pressing the wrapper onto itself, the food product is prepared for the next station. During flipping, having a wrapper sealed or partially sealed around the filling prevents the filling from flying out when the food product is flipped. Food waste is reduced and each product has a consistent (within a tolerance) amount of filling. As explained above, this station's operation does not stop or slow down the conveyor. In some examples, optical sensors are used to coordinate lowering the stamper 142 onto the food product in order to press the wrapper 122 about the filling 132. The optical sensor detects a position of the wrapper, such as the leading edge or the filling, and times the lowering of the stamper based on the position. Certain embodiments may use weight, pressure, ultrasonic, infrared, or other sensors to determine a position of the food product, wrapper, and/or filling and coordinate the stamper's operation. Further, any other optical sensor discussed herein may be replaced with any suitable position sensor.

Alternately, a speed of the conveyor is used to estimate the lowering frequency of the stamper. In other examples, the stamper lowers according to a time interval and may or may not incorporate any sensors. In other examples, the apparatus does not have optical sensors at this station and lowering of the stamper occurs based on the travel time of the food product from one station to the stamper 142.

From the first stamper station, the food product continues to move to the first flipping station 144. At the first flipping station, a portion of the food product that includes the filling is flipped or rotated backwards (e.g., 180 degrees) onto a trailing edge of the wrapper. As a result, the portion of the filling previously adjacent the conveyor and the leading edge of the wrapper moves to the top, opposite of the conveyor. The trailing edge wraps around a side (e.g., a front side) of the food product and around the bottom portion of the food product (e.g., under the filling), thereby defining a wrapper layer of the food product.

The first flipping station 144 has a flipping mechanism 146 and guide plates (shown and described to best effect below with respect to FIGS. 8A-8B). The flipping mechanism 146 is positioned under the conveyor and rotates upwards, towards the food product. In some cases, the flipping mechanism 146 includes a prong or a set of prongs, which have rounded inside surfaces to facilitate flipping. The edge of the flipping mechanism 146 interfaces with a leading portion of the food product. As the food product is flipped backwards, it pivots with respect to a trailing portion of the food product. In some examples, the food product pivots relative to a pin that protrudes from guide plates at each side of the flipping stations. The flipping mechanism 146 acts as a ramp which guides the food product as it flips. Prongs of the flipping mechanism slide from the leading edge to the top of the food product as it rotates. Once the food product is flipped, the flipping mechanism retracts under the conveyor 112, allowing the food product to continue moving along with the conveyor without stopping or slowing down the conveyor. The guide plates abut against each side of the food product during flipping. These guide plates center the food product with respect to the conveyor and control the flipping motion. By controlling the flipping motion, food waste is reduced.

After the first flipping station, the food product moves to the second flipping station 148. Similar to the first flipping station 144, the second flipping station has a flipping mechanism 150 and guide plates (not shown, see description in FIGS. 9A-9B). The flipping mechanism 150 is positioned under the conveyor and rotates upwards, in a counter-clockwise direction, flipping the filling 180 degrees and the wrapper onto itself. Once the filling is flipped, the leading edge of the wrapper and the trailing edge of the wrapper are under the filling. In this flip, the wrapped food product generally follows the shape of the filling. Similar to explained above, the second flipping station 148 has guide plates that control the flipping motion of the food product and ensure that the food product is centered with respect to the conveyor.

In some examples, each of the flipping stations has optical sensors that detect the position of the food product, whether along the conveyor, relative to a flipping station, or both. By utilizing the position of the food product, the guide plates in each of the stations may move towards the food product to align it before it reaches the flipping mechanisms 146 and 150. The flipping mechanism emerges from under the conveyor before the food product reaches it, then contacts the leading edge of the food product and rotates upwards as the belt moves, thereby rotating the food product. Insofar as the optical sensor tracks the position of the food product, this allows the stations to adjust their function, timing, and/or movement to ensure the food product is properly flipped. Coordination of the stations using optical sensors allows the conveyor to continuously move so that the stations do not create a bottleneck in the wrapping process. In some embodiments, other sensors can be used in addition to or alternatively from the optical sensor. For example, the apparatus can have a mechanical sensor that detects an edge of the wrapper as it passes at a particular marker of the conveyor.

After the second flip, the wrapped food product is pressed. The press 152 compresses the wrapper around the filling and generally forces the wrapper and filling to conform to a final shape. The press further helps the wrapper to adhere to itself thereby retaining its shape during shipping, frying, freezing, or any other subsequent process. The press 152 uses sufficient force to compress the wrapper and the filling without breaking the wrapper. Similar to other stations, this stamping station can have optical (or other) sensors that detect the position and press the food product based on the estimated or the observed position of the food product. In some embodiments, the press 152 is positioned over the conveyor and is lowered to the food product using a piston.

As illustrated in the example of FIG. 1, the apparatus includes misters 154. The misters are placed before each folding station and before each flipping station to hydrate the wrapper prior to folding and flipping, although in some embodiments one, some, or all of the misters may be omitted. Hydrating the wrapper prevents breakage of the wrapper when the wrapper is folded or flipped. Also, hydrating the wrapper allows the wrapper to adhere to itself. As a result, the adhered wrapper keeps the filling in place and may help prevent or reduce an amount of the filling spilling out during flipping. In turn, this reduces food waste and ensures a relatively consistent weight and amount of filling for each of the wrapped food products. The misters can spray water or any other water-based solution (e.g., starchy water or flavorings), depending on the wrapper ingredients, wrapper composition, and/or nature of the food product, for example. After the food product is wrapped, it may be transferred for storage, frying, baking, packaging, or any other process, as it is known to one of skilled in the art.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, the foregoing and following descriptions of specific embodiments are presented for the purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
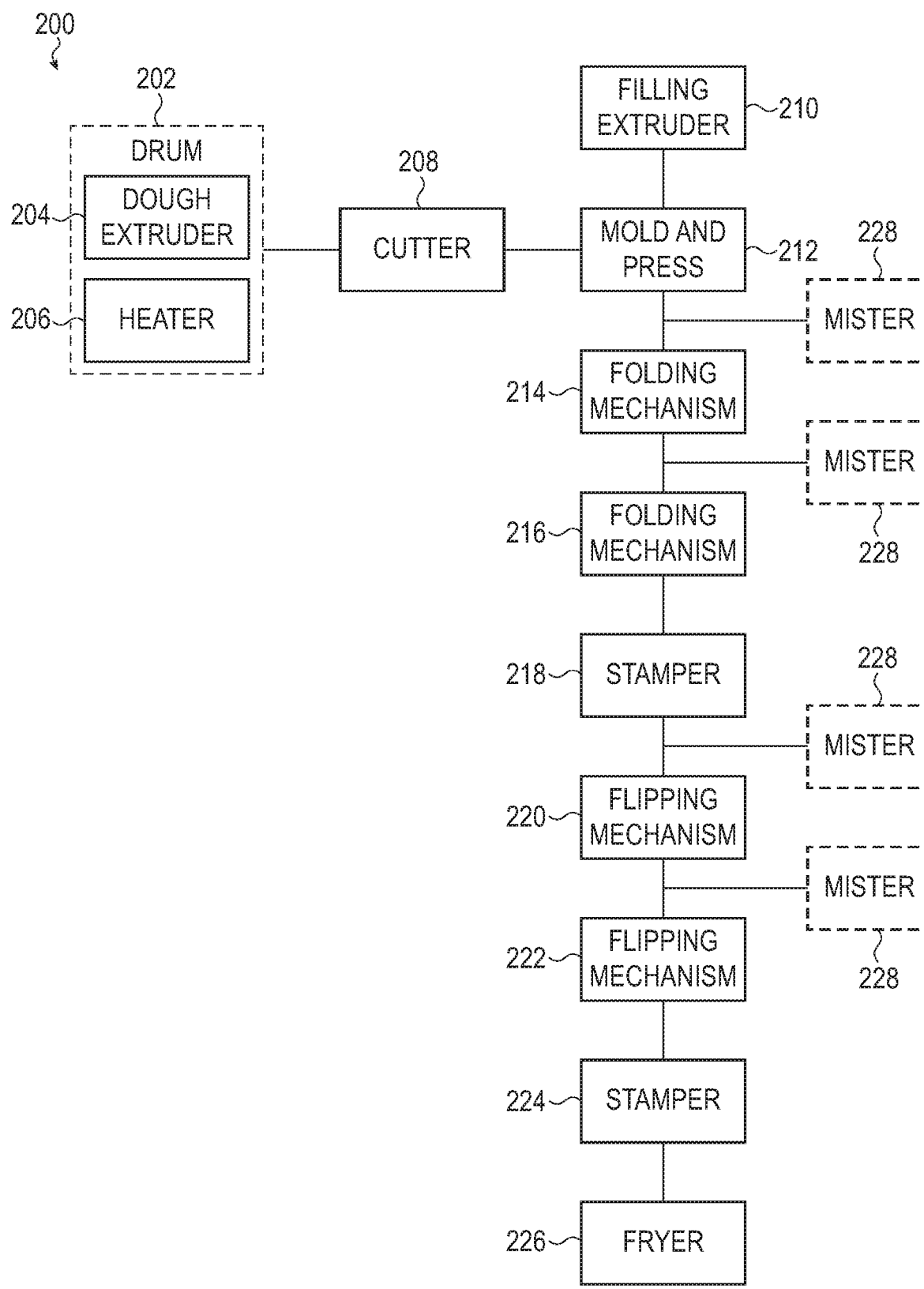
FIG. 2 is a flowchart of an example apparatus for making a wrapped food product, such as described herein.

FIG. 2 is a system diagram showing one sample operating method for the apparatus 100 of FIG. 1. The apparatus 200 for making a wrapped food product has a series of mechanisms that wrap a filling around an edible wrapper. Each of the mechanisms shown on the system diagram interfaces with a conveyor, which continuously transports the food product (e.g. the dough, the wrapper, the filling, and/or the filling on wrapper) across each station. Each of the mechanisms shown operates independently from each other. However, in some embodiments, the mechanisms share a single timing mechanism, monitor, or the like controlling and/or synchronizing their operation. Additional detail of each of the mechanisms of the apparatus is provided herein.

An apparatus 200, as shown, can include three main zones. The first zone receives raw dough and makes wrappers from the cooked dough. The second zone receives and shapes the filling. The third zone receives the wrapper and the filling and wraps the wrapper around the filling using a series of folds, flips, and presses to achieve the wrapped product. In some embodiments, the apparatus 200 may lack either or both of the first zone and the second zone. Further, any or all of the elements in any zone may be omitted in different embodiments.

The first zone has a drum 202. The drum includes a dough extruder 204 and a heater 206. As explained above, the drum 202 acts as an oven to quickly cook the dough extruded. The drum 202 concentrates heat within to cook the dough. The thickness of the dough and the heat required to cook the dough depends, at least in part, on the type of dough used to make the wrappers. For example, more flexible dough (e.g., from flour with high gluten content) may be thinner than more brittle doughs (e.g. with less gluten or gluten free). In some embodiments, a vegan rice flour is used. The drum 202 outputs a continuous cooked dough sheet.

Some embodiments have bars and fans (see, e.g., FIG. 1) at the outlet of the drum. The bars guide the cooked dough sheet upwards to separate it from the conveyor, thus preventing sticking of the cooked dough sheet to the conveyor. The fans cool the dough sheet after cooking and help draw out moisture from the cooked dough to prevent sticking.

The cutter 208 cuts the continuous dough sheet into individual wrappers. Prior to cutting, the cooked dough sheet travels with the conveyor and passes through the bars and the fans to ensure the sheet does not stick to the conveyor. Next, a cutting mechanism receives cooked dough and cuts segments of the dough into wrappers. As each wrapper is cut, the cut wrappers are placed on the conveyor, leaving a separation between each wrapper. This separation can allow subsequent stations to perform flipping, pressing, or folding operations simultaneously on different food products, thereby increasing the efficiency and speed of the apparatus. As explained above, in some embodiments, the apparatus 200 receives as an input pre-cut wrappers which are fed onto a conveyor.

The second zone has a filling extruder 210 and a mold and press mechanism 212. The filling extruder has a hopper that stores the filling and feeds the extruder mechanism. The filling is a cooked food product that can be shaped and molded (e.g., a filling with low moisture content). The hopper and the extruder are adjacent to the conveyor, in some examples. The extruder turns the filling to transfer it from the hopper to a mold (e.g. through a tube). The extruder 210 pushes the filling into the mold, thereby compacting it into the mold and filling the mold cavity. The mold and press mechanism 212 receives the filling, moves the filling over the conveyor, and presses the filling onto the wrapper.

Similar to the first zone, some examples of the apparatus do not have the second zone. In some embodiments, pre-shaped filling pieces are positioned over the wrapper (e.g., by a claw or a feeder). In some embodiments, the filling is frozen, thereby allowing the filling to maintain its shape.

In the third zone, the filling is wrapped. In this zone, once the filling is positioned onto the wrapper, the food product (e.g., the filling and the wrapper) continues to travel with the conveyor. In some cases, the conveyor supports at least a central portion of the wrapper. As the wrapper approaches the folding station, the sides of the conveyor include side portions that align or lift the sides of the wrapper prior to folding. As a result, the wrapper moves with the conveyor and relative to the fixed side portions. These fixed side portions have smooth surfaces which allow the sides of the wrapper to pass over these portions smoothly and into the folding mechanism surface.

The first folding mechanism 214 is positioned flush with one side portion. The first folding mechanism 214 includes, for example, a plate. As explained above, the folding mechanism folds one side of the wrapper over a portion of the filling. As the wrapper travels through the apparatus 200, one side of the wrapper passes over the folding mechanism 214 and, when the entire length of the wrapper is within the length of the folding mechanism 214, the plate rotates upwards from the flush position to an upright position. This motion causes the wrapper to cover a portion of the filling.

The second folding mechanism 216 folds the side of the wrapper opposite the first side. The second folding mechanism 216 has a plate positioned on a side of the conveyor belt, similar to the first plate mechanism. When the food product approaches this station, the second side folds over a portion of the filling and a portion of the first side that has been folded, causing an overlap between the first side and the second side. In some examples, the first folding mechanism 214 and the second folding mechanism 216 operate independently from each other. Some folding mechanisms 216 include a guide plate positioned along the first side of the fixed side portions. The guide plate centers the food product with respect to the fourth segment of the conveyor.

The first stamper 218 of the apparatus 200 presses the wrapper onto itself and around the filling. For example, the first stamper has two columns that extend perpendicular to the direction of the conveyor. When the stamper presses down, the wrapper envelops the thickness of the filling around the front side and the back side of the food product. After pressing the wrapper, the stamper retracts rapidly as the food product continues to travel along the conveyor.

The first flipping mechanism 220 and the second flipping mechanism 222 flip the filling 180 degrees in a direction opposite the velocity of the conveyor. Alternatively, a single flipping mechanism 220 can be used. In some embodiments, the first flipping mechanism 220 and the second flipping mechanism 222 work simultaneously (e.g., flip a different food product at the same time). The tandem operation of these mechanisms 220 and 222 utilizes a consistent separation between food products at these stations. The first and the second flipping mechanisms 220 and 222 each has a claw-like prong or a set of claw-like prongs that engages the leading edge of the food product and rotates upward causing the food product to pivot and flip. Each claw-like prong resides under the conveyor. For example, the conveyor has more than one belt loop. The prongs of the flipping mechanisms emerge from the gap between these belt loops. As the filling portion of the food product rotates, the filling lands on the trailing portions of the wrapper, thus flipping onto itself. On the second flip, the trailing edge of the wrapper and the leading edge of the wrapper are under the filling of the food product.

The stamper 224 is positioned over the conveyor and compresses the food product against itself. In some examples, the stamper has a flat contact surface that presses the top portion of the filling in the direction of the conveyor. As explained above, the folded portions of the wrapper can further adhere to each other, preventing the filling from escaping.

Misters 228, as explained above, are part of apparatus 200 in some examples. The misters add moisture to the wrapper. The moisture prevents breakage and allows the wrapper to cling onto itself during each flip and prevents the filling from dispersing during each flip. Residual moisture can also help seal the food product.

In some examples, the apparatus 200 includes a fryer 226. Once the food product passes through the final stamper 224, the conveyor continues to carry the food product into a fryer. The fryer can be a deep fryer. Here, the food product can continue to move through a conveyor to cook the food product. In some examples, the food products are cooked in baskets and are removed by batches.

Figure 3:
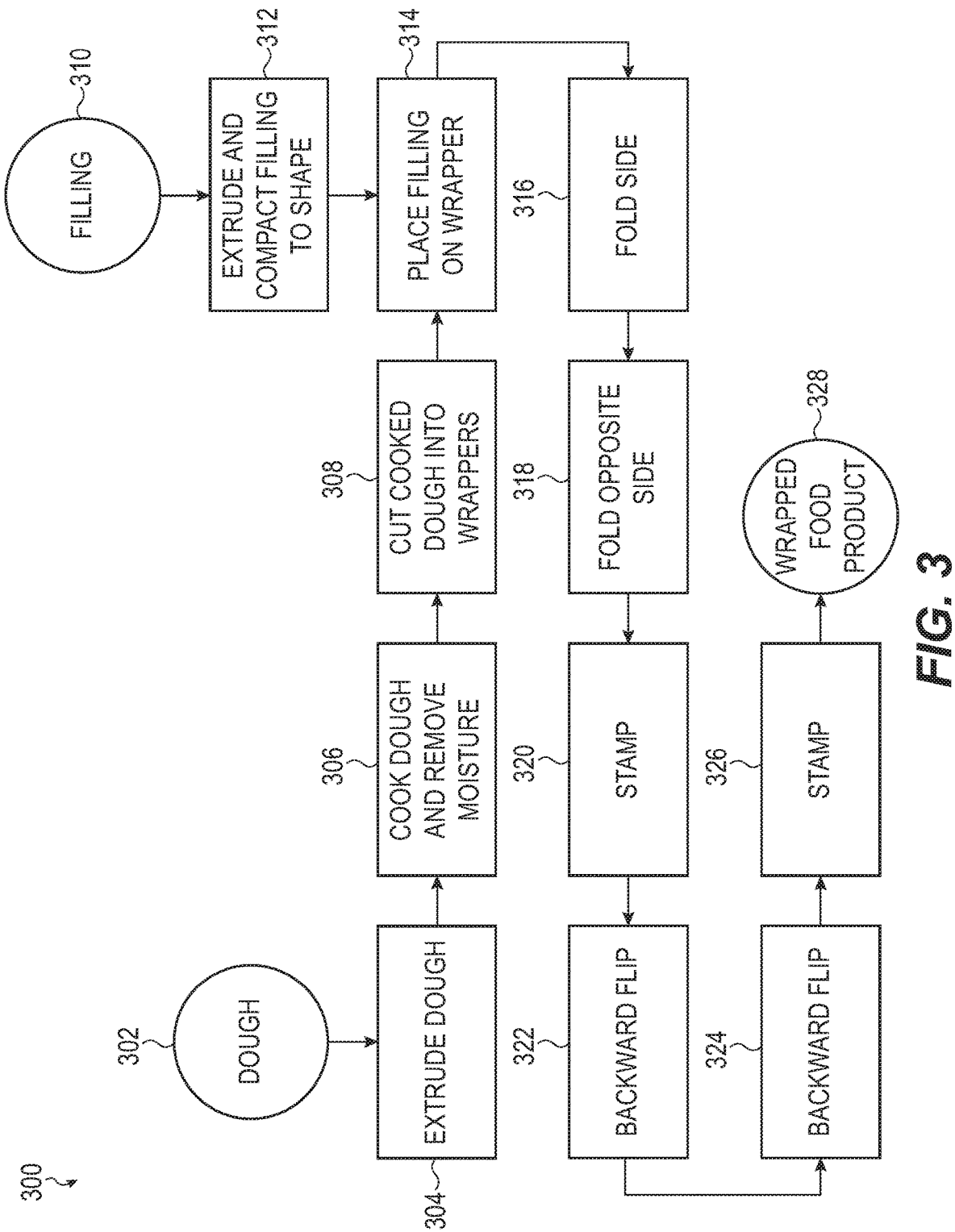
FIG. 3 is a flowchart depicting example operations of a method of making a wrapped food product, such as described herein.

FIG. 3 is a flowchart illustrating a method 300 for wrapping a food product. The method can be performed using a variety of apparatuses, such as apparatus 100 and/or apparatus 200. The described method 300 envelops a filling 310 in a wrapper using a unique shape. The described method requires minimal cutting of dough and of the wrapper, thereby minimizing food waste. In addition, the unique shape is attractive to users looking for alternatives to traditional wrapped food products, such as burritos, empanadas, calzones, and so on.

The method 300 uses dough 302 as an input. At step 304, the dough is extruded into a thin sheet with uniform thickness. During the extrusion, the extruded sheet has a uniform width. The width and thickness of the sheet is a function of the dough used and the amount of filling to be used (e.g., the size of the food product). At step 306, the extruded dough is cooked and the moisture is removed. This step is performed to make the dough pliable for subsequent folding and flipping steps. Removing moisture prevents sticking of the dough to the equipment. At step 308, the dough sheet is cut into wrappers. In some examples, each wrapper is the same dimension to ensure that the food product has a consistent size. In some embodiments, the wrapper is rectangular. In other embodiments, the wrapper is square. Each wrapper has a dimension that is at least twice the length of filling such that each food product can be flipped twice.

The filling 310 is the second input. At step 312, the filling is extruded and compacted to form a shape. For example, step 312 uses a mold to create the shape of the filling. A pre-formed shape of the filling allows for a consistent weight and size of the food product. In some examples, the filling is a cube or a cuboid shape that facilitates folding into a standard geometrical, straight shape. The extruded filling is cooked or partially cooked. The filling can be a wide range of flavors and have a variety of textures. For example, in some products, the filling is vegan and allergen free.

At step 314, the shaped filling is placed onto the wrapper. The position of the filling depends on the dimension of the wrapper with respect to the filling. In some embodiments, the front third of the wrapper is used to position the filling such that, when flipped twice, the wrapper is tucked under the filling. Due to the prior shaping and compacting step 312, the filling maintains its shape at step 314.

At step 316, a first side of the wrapper is folded over a portion of the filling. The food product folds along the length of the wrapper from the edge of the filling on the first side to the peripheral side edge of the wrapper. At step 318, the side opposite of the first side is folded over a portion of the filling and a portion of the folded wrapper. Similar to step 316, the food product folds along the length of the wrapper, starting from the edge of the filling on the second side to a peripheral second side edge of the wrapper. The resulting overlap between the folded portions of the wrapper adheres to itself, due to moisture from misters, for example. The adhesion of the wrapper to itself keeps the filling within the wrapper. At step 320, the wrapper is further secured to itself by stamping the side of the wrapper on the filling. By stamping the sides, the wrapper envelops the filling thereby creating a pocket. The purpose of this station is to, at least partially, ensure that the wrapper has sufficient adhesion to secure the filling during flipping.

At steps 322 and 324, the filling is flipped. Step 322 is a first backward flip. The portion of the filling at the bottom of the food product moves to the top of the conveyor (e.g., it is rotated 180 degrees). The filling is flipped onto itself. As such, a portion of the tail of the wrapper that does not contain filling wraps around a side of the food product and under the filling, creating another layer of the wrapped filling. At step 324, the food product is flipped in the same manner as step 322. At this step, the last portion of the tail (e.g., the edge) of the wrapper and a portion of the leading edge of the wrapper folds onto itself and defines the bottom surface of the food product, each of the folded edges forming a layer of the wrapped food product. At step 326, the food product is stamped to further adhere the wrapper to itself (e.g., to adhere each layer of the wrapper adjacent layers of the wrapper). At this step, the wrapped food product 328 can be fried, stored, baked, and so on and retain its shape.

FIGS. 4A-10B illustrate an embodiment of each station of an apparatus for making a wrapped food product, such as the apparatus 100 or 200. As explained above, each station is positioned along a continuously moving conveyor. Each station operates without pausing or holding the food product. Each station is coordinated through optical sensors and/or timers that can be triggered when the food product passes through each station.

Figure 4A:
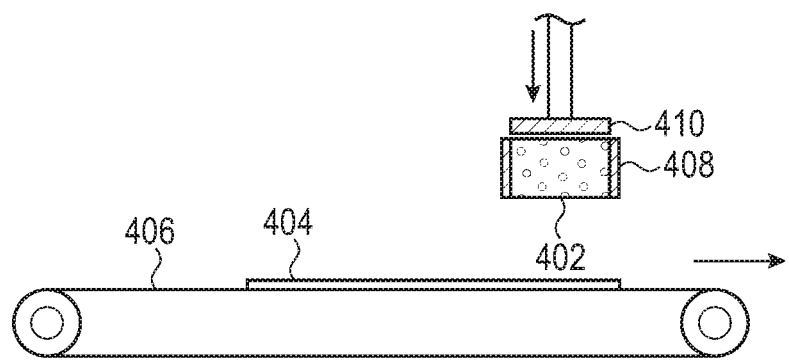
FIGS. 4A-4C depict an example of a filling extruder and positioning station of an example apparatus.
Figure 4B:
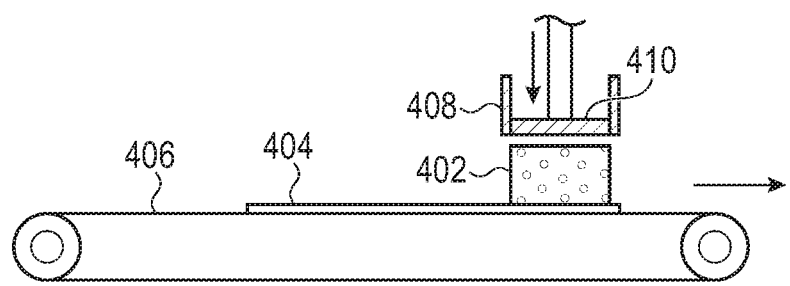

FIGS. 4A-4B illustrate the positioning of the filling over the wrapper. In this station, as explained above, the filling is positioned onto the conveyor. As shown in FIG. 4A, the filling is positioned over the wrapper 404 as the conveyor 406 moves (e.g., towards the right, as shown in the figure). The mold 408 can shift towards and away from the wrapper (not shown) in a direction towards and away from the page, respectively. In the position where the mold 408 is over the conveyor 406, the press is aligned with respect to the mold. In this position, the filling is transferred to the wrapper. In the position where the mold is being filled, the mold is aligned with the extruder tube (not shown), away from the conveyor.

As shown in FIG. 4B, once the mold is aligned with the press 410, the press 410 pushes downward into the mold 408. In some examples, the outside dimensions of the press 410 may correspond to the inside dimensions of the mold 408. As a result, the press 410 encircles the inside perimeter of the mold 408 pushing the filling 402 from the mold and onto the wrapper. The pressing from the mold to the wrapper can occur within less of a second, seconds, fragments of a minute, and so on. The distance between the mold and the wrapper is small enough that the filling retains its shape as it falls from the mold to the wrapper.

Figure 4C:
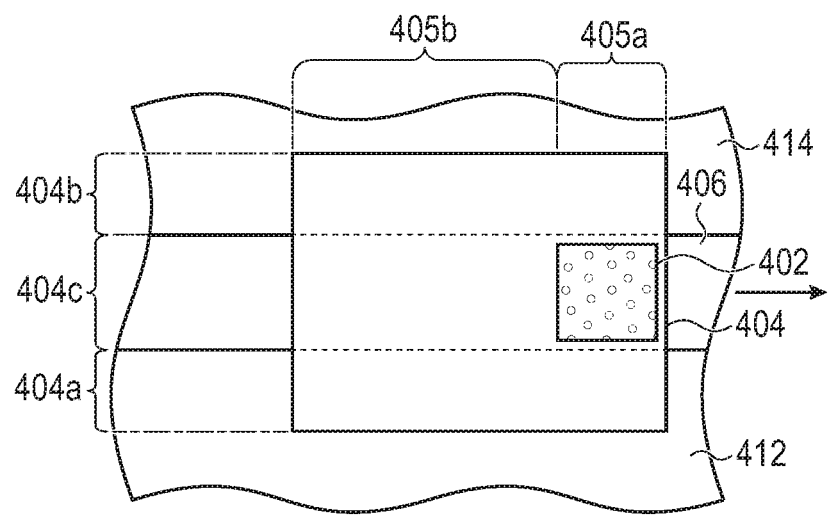

FIG. 4C shows a plan view of the filling 402 over the wrapper 404 once the filling is positioned over the wrapper (e.g., FIG. 4B). As shown, the wrapper has a leading portion 405a and a trailing portion 405b. The filling 402 is positioned over the leading portion 405a of the wrapper. The wrapper has three main regions: a first side region 404a and a second side region 404b, and a middle region 404c. The middle region 404c of the wrapper is placed over the conveyor 406. Also, the filling 402 is placed within the middle portion 404c, within the conveyor 406. The side regions 404a and 404b slide over side portions, 412 and 414, respectively. As discussed above, the side portions support the sides of the wrapper. The side portions can be a conveyor that moves at the same speed as the middle portion or can be fixed. By positioning the filling over the leading portion 405a, the food product can be flipped twice to achieve a cuboid or nearly cuboid shape. The precise placement of the filling 402 within the middle region 404c (e.g., corresponding to the conveyor 406) and to the leading portion 405a allows each side of the wrapper to be folded and flipped consistently and continuously. The filling atop the wrapper, as shown in FIG. 4C, continues to the next stations.

Figure 5A:
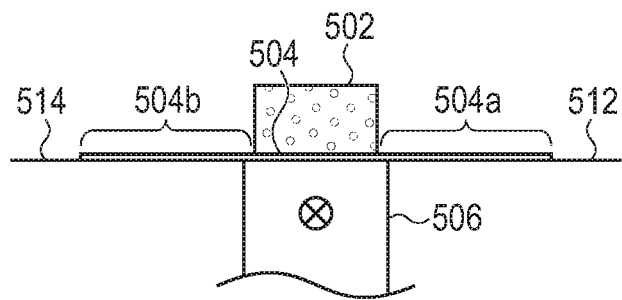
FIGS. 5A-5D depict an example of a folding station of an example apparatus.
Figure 5B:
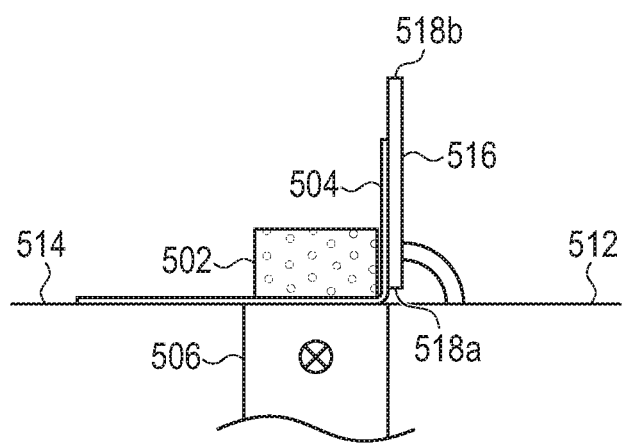
Figure 5C:
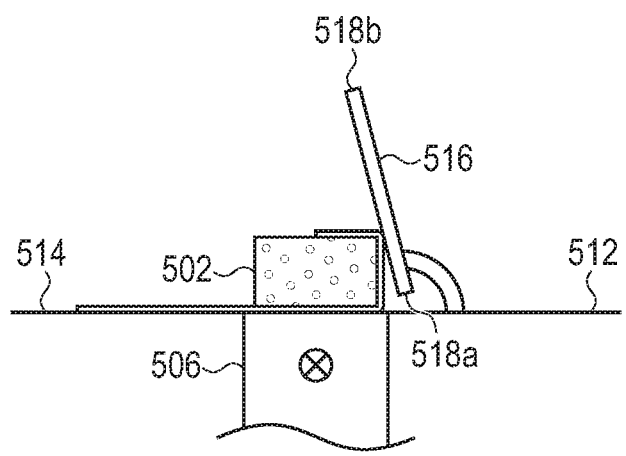

FIGS. 5A-5D illustrate the first folding station steps. At the first folding station, a first side of the wrapper is folded over the filling. The view of FIGS. 5A-5C shows the food product with a traveling direction into the page.

FIG. 5A shows the food product as it enters the first folding station. The conveyor 506 supports the filling and is moving, while sides 512 and 514 separate the side portions of the wrapper as it travels with the conveyor. In some examples, these sides are fixed. A plate 516 is positioned flush with side 512 (e.g., the flush position). As the wrapper 504 moves into the page, the wrapper moves over the plate 516.

Once the length of the wrapper is within the plate, the plate rotates upwards, as shown in FIG. 5B. The plate is attached to a mechanism that pivots the plate from the edge closest to the conveyor 518a. As the plate pivots, the side of the wrapper 504a moves with the plate. In some embodiments, the width of the filling is within a small margin from the width of the conveyor. For example, the width of the filling is 3 mm, 5 mm, 1 cm, 2 cm smaller than the width of the conveyor. When the wrapper folds over the filling, the plate closely abuts the walls of the filling 502 (due to the proximity of the edge of the filling to the edge of the conveyor) and the wrapper contacts the walls and the top of the filling.

As illustrated in FIG. 5C, as the plate 516 rotates (e.g., the upward-most position), the plate defines an incline between the edge closest to the conveyor 518a and the edge furthest from the conveyor 518b. This incline dislodges the wrapper from the plate, causing it to rest over the filling. After reaching this position, the plate 516 returns to the flush position. In some examples, this process occurs within fragments of a second. The inertia and speed of the process facilitates the folding of the wrapper without stopping or slowing down the conveyor 506.

Figure 5D:
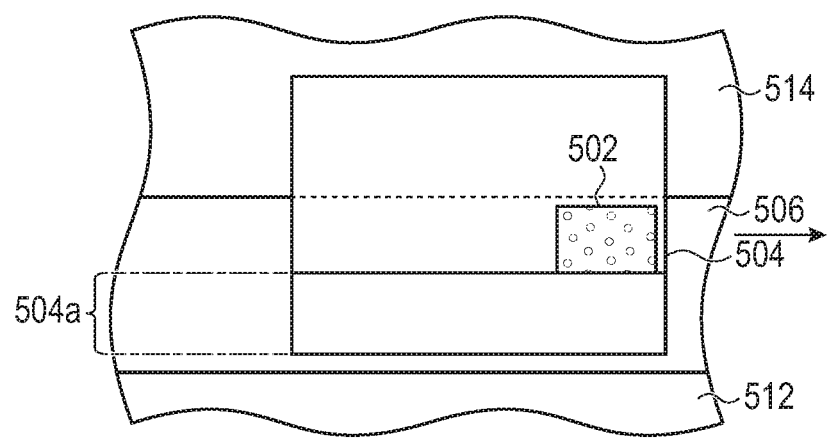

FIG. 5D shows a plan view of the food product after the first fold. The folded side of the wrapper 504a drapes over a portion of the filling 502 and a central portion of the wrapper not covered by the filling. In some examples, the folded side 504a is within the conveyor.

Figure 6A:
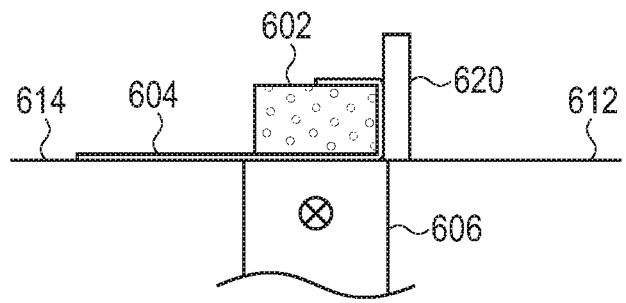
FIGS. 6A-6D depict an example of a folding station of an example apparatus.
Figure 6B:
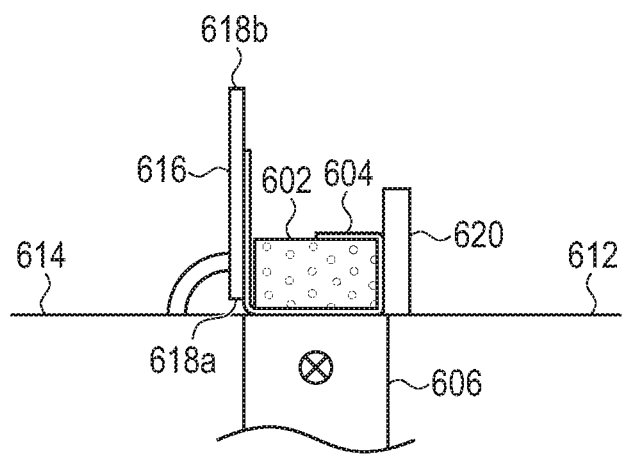
Figure 6C:
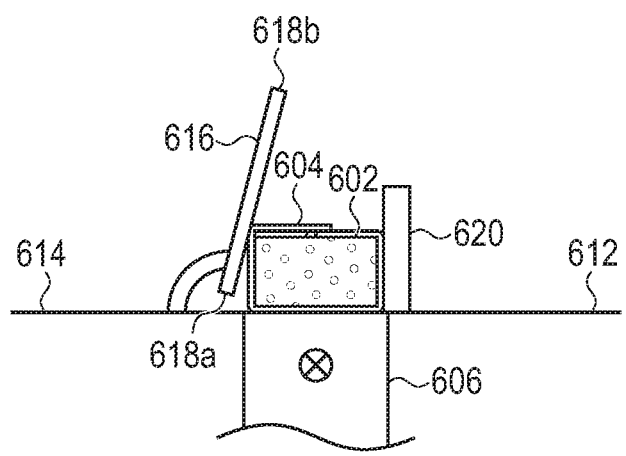

FIGS. 6A-6D illustrate the second folding station steps. At the second folding station, an opposite side of the wrapper is folded over a portion of the filling and a portion of the wrapper. The view of FIGS. 6A-6C shows the food product with a traveling direction into the page.

FIG. 6A shows the food product as it enters the second folding station. The conveyor 606 supports the filling as it is moving, while sides 612 and 614 are not in motion. A plate 616 is positioned flush with side 614 (e.g., the flush position). As the wrapper 604 moves into the page, the wrapper moves over the plate 616. In some embodiments, the side 612 includes a guide plate 618. The guide plate 618 guides the folded side of the food product along side 612 to ensure that it is centered with respect to the conveyor. Any misalignment from the first folding station, for example, is corrected at this step. For example, when the width of the filling, as explained above, is within 3 mm of the width of the conveyor, the alignment of the filling with respect to the conveyor is more important because the close alignment ensures that the wrapper is closely folded with the filling and helps keep the filling from flying out during flipping. In addition, the guide plate 618 can help push the sides of the folded wrapper closer to the filling.

Once the length of the wrapper is within the plate 616, the plate 616 rotates upwards, as shown in FIG. 6B. The plate 616 is attached to a mechanism that pivots the plate 616 from the edge closest to the guide plate 618a. As the plate pivots, the side of the wrapper 604a moves with the plate 616. Similar to the first folding station, when the wrapper folds over the filling, the plate closely abuts the walls of the filling 602 (due to the proximity of the edge of the filling to the edge of the conveyor) and the wrapper contacts the walls and the top of the filling.

As illustrated in FIG. 6C, as the plate 616 rotates (e.g., the upward-most position), the plate defines an incline between the edge closest to the guide plate 618a and the edge furthest from the guide plate 618b. Similar to the first folding station, this incline dislodges the wrapper from the plate, causing it to rest over the filling. After reaching this position, the plate 616 returns to the flush position. In some examples, this process occurs within fragments of a second. The inertia and speed of the process facilitates the folding of the wrapper without stopping or slowing down the conveyor 606.

Figure 6D:
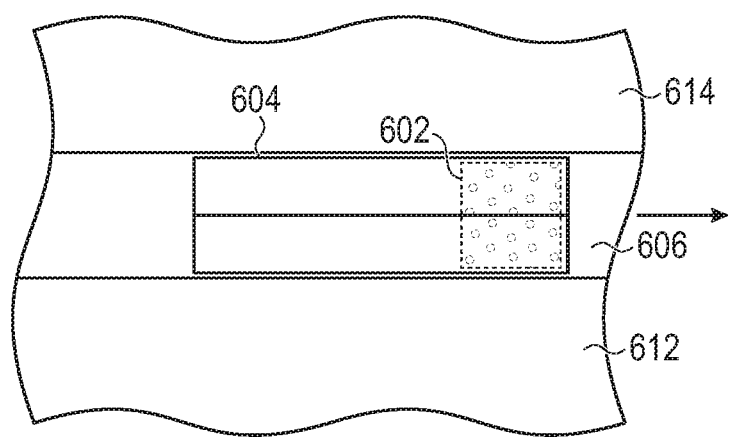

FIG. 6D shows a plan view of the food product after the second fold. The second folded side of the wrapper 604 drapes over a portion of the filling 602, a central portion of the wrapper not covered by the filling, and a portion of the first side of the folded wrapper 604. In some examples, both folded sides are within the conveyor.

Figure 7A:
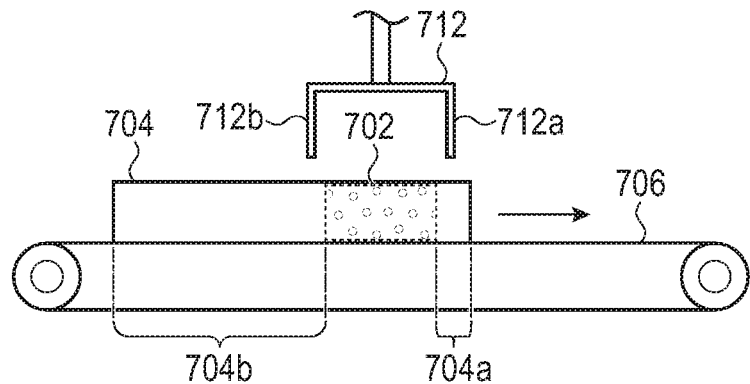
FIGS. 7A-7C depict an example of a stamping station of an example apparatus.
Figure 7B:
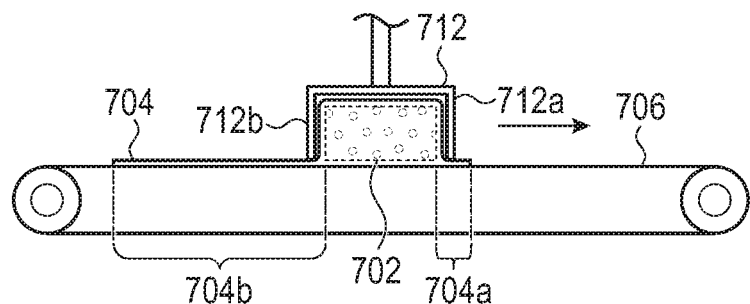
Figure 7C:
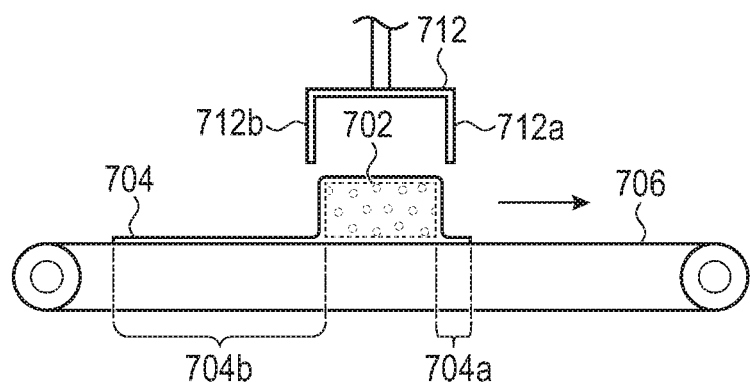

FIGS. 7A-7C illustrate the first stamping station. At this station, the wrapper is pressed down against the walls of the filling. Pressing the wrapper against itself and the filling creates a seal between the leading and the trailing portions of the wrapper. During subsequent flipping steps, the filling keeps inside the wrapper despite the fast turning motion of the flipping mechanisms.

As shown in FIG. 7A, the food product from the second folding step wraps the top portion of the filling 702, leaving a leading portion 704a (e.g., the front portion of the wrapper in the direction of the conveyor 706) without filling, and a trailing portion 704b (e.g., the back portion of the wrapper in the direction of the conveyor 706) without filling. In some examples, the length of the leading portion 704a (e.g., measured along the conveyor) is smaller than the trailing portion 704b of the wrapper. For example, the leading portion may be a tenth of the trailing portion, a quarter of the trailing portion, half of the trailing portion, and so on.

The stamping station has a press 710 that hovers over the conveyor 706. The press includes two columns, 712a and 712b. Each column spans at least the width of the filling 702. In some examples, each column spans at least the width of the conveyor 706. The columns are separated from each other (along the direction of movement of the conveyor) by a distance at least the length of the filling (e.g., measured along the direction of the movement of the conveyor). In some embodiments, the distance between the columns includes a tolerance that accounts for the length of the filling, the thickness of the wrapper on both sides, and an added factor for the movement of the conveyor when the press is lowered. The distance between the columns 712a and 712b closely follows the walls of the filling to closely tuck the wrapper around the filling.

As shown in FIG. 7B, once the food product is under the press 710, the press quickly lowers such that each column 712a and 712b enclose the filling 702. As the press 710 lowers, column 712a pushes down on the leading portion 704a of the wrapper and column 712b pushes down on the trailing portion of the wrapper 704b. As a result of the wrapper 704 being pushed down, the top portion of the wrapper and the bottom portion of the wrapper that the column pressed down on sticks to itself, thereby creating a seal. A seal of the wrappers means that the wrapper is fully or partially adhered to itself, thereby adding a layer of protection when the food product is flipped. Part of the leading portion of the wrapper drapes over the front wall of the filling. Part of the trailing portion of the wrapper drapes over the back wall of the filling. In other words, the wrapper is pressed around the filling at this station. As explained above (FIG. 1) the press uses sufficient force to stick the wrapper to itself without breaking the wrapper.

FIG. 7C shows the wrapper after the stamping station. The leading portion and trailing portion of the wrapper remain flattened against the bottom. The press 710 quickly retracts to clear the food product. As with other stations, the conveyor does not slow down or stop at this step.

FIGS. 8A-9E illustrate the flipping stations. In particular, FIGS. 8A-8E illustrate the first flipping station and FIGS. 9A-9E illustrate the second flipping station. At each of these stations, the filling is flipped backwards (e.g., 180 degrees) onto itself. With each flip, a portion of the wrapper not covered by the filling tucks under the filling, thereby creating a neatly wrapped food product that generally follows the shape of the filling when it is placed atop the wrapper. Each fold creates an additional layer of the wrapper abutted to the filling.

The first flipping station has a prong or a set of prongs. For example, the flipping station has a prong 820. Before the food product reaches this station, prong 820 is under the conveyor. As previously discussed, the conveyor has, for example, three belt loops, each defining a gap between belt loops. The first prong is under the conveyor 806 between a first belt loop and a middle belt loop, for instance. The second prong is under the conveyor 806 between the third belt loop and the middle belt loop. The flipping mechanism can interface with the food product without slowing or stopping the conveyor.

The prong 820 or set of prongs has a curved shape on the inside portion of the prong. In some embodiments, this curve defines a backwards "C" shape or a smooth shape (e.g., without sharp corners). The curvature of the prong is configured to allow the filling to rotate without catching on the filling or the wrapper. This shape also provides a level of grip that allows the mechanism to control the rotation without tossing the filling.

The flipping station also has a set of guide plates 830. Each guide plate is positioned on either side of the conveyor 806. The guide plates 830 are not coupled to the conveyor 806. The guide plates 830 ensure that the food product (e.g., the filling with the wrapper) is centered with respect to the conveyor. The guide plates 830 also help control the motion of the food product during flipping by keeping the food product from straying outside of the conveyor during the flip.

In some embodiments, the guide plates 830 can move in along two axes. First, the guide plates can move in a direction of the movement of the conveyor and in a direction opposite of the conveyor (e.g., left to right and right to left in FIG. 8A). With this motion, the guide plates move opposite the conveyor to meet the food product as it approaches the station. The guide plates continue to move (in the direction of the conveyor) with the food product during flipping, without impacting the motion of the conveyor or the food product. Second, the guide plates can move in a direction towards the conveyor and in a direction away from the conveyor (e.g., towards the page and away from the page in FIG. 8A). The guide plates move towards the conveyor to abut the food product before and during flipping. After flipping, the guide plates move away from the conveyor and the food product. Some embodiments of the guide plates have guiding pins 832. The guiding pins help control the pivot point of the filling as it flips on itself.

Figure 8A:
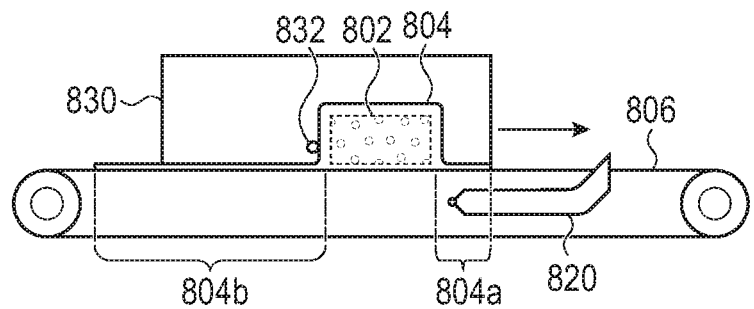
FIGS. 8A-8E depict an example of a flipping station of an example apparatus.

As shown in FIG. 8A, as the food product reaches the flipping station, the prong 820 begins to emerge from under the conveyor 806. In some examples, the tip of the prong engages the leading portion 804a. At this point, the food product is positioned between the guide plates, each guide plate 830 abut a side of the food product. The guiding pin 832 is positioned behind the filling.

Figure 8B:
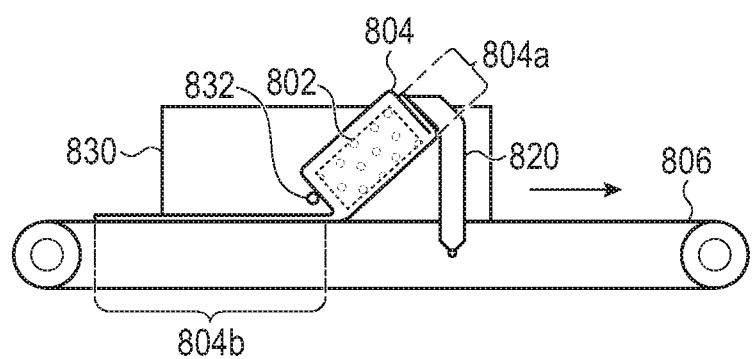

FIG. 8B shows the food product in the middle of being flipped by the prongs. The filling 802 and abutting portions of the wrapper pivot about the bottom trailing portion as the prong 820 rotates in a direction away from the conveyor 806. As the filling and the abutting wrapper flip, the wrapper contours to the shape of the prong's inner surface, which controls the flipping motion.

Figure 8C:
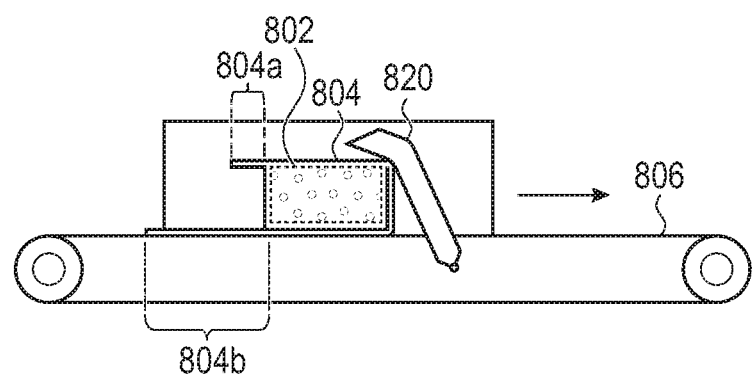

FIG. 8C shows the food product after the filling and associated portion of the wrapper are flipped and the prong 820 is fully rotated. As shown in the figure, once the filling and associated portion of the wrapper are flipped, the leading portion 804a moves to the top, back position of the food product with respect to the conveyor. Part of the trailing portion 804b (before flipping) folds around a side portion on the filling and rests under the filling 802. Part of the trailing portion remains unwrapped (e.g., not abutted to the filling) in the bottom back portion of the food product with respect to the conveyor. As a result of this flip, the top, back, left, and right portions of the food product have a single layer of wrapper while the bottom and the front portions have a double layer of wrapper. In this position, the prong 820 contacts the top of the food product and the guide plates retract such that the pin does not interfere with the food product.

Figure 8D:
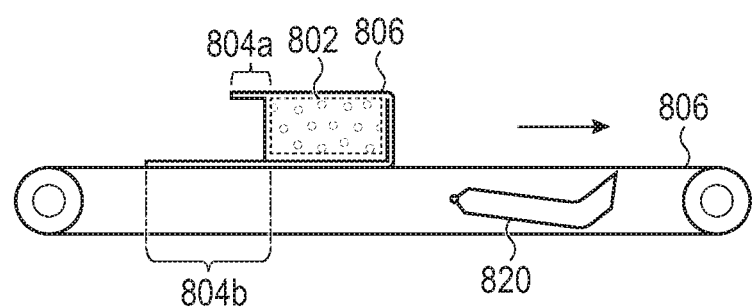

FIG. 8D illustrates the last step of the first flipping station. In this step, the prong is fully retracted under the conveyor 806 and the guide plates remain retracted from the food product. In this position, the food product continues moving down the conveyor without catching on any mechanisms from this station. As explained above, the prongs pop upward to flip the filling onto itself and retract rapidly. Because of this rapid motion, the motion of the food product along the conveyor is not impacted. In addition, the stamper stations and the guide plates prepare the food product for this rapid motion without scattering the filling out of the wrapper.

While the above illustrations show the prongs as curved ramps that guide the flipping motion of the food product, other embodiments that flip the food product are possible. For example, the flipping mechanism can include a bracket-like mechanism that emerges from the conveyor and receives the side (e.g., the front side) of the food product. The food product moves into the claw as it continues to move. The bracket mechanism then rotates, flipping the food product such that the wrapper sits on the trailing edge of the wrapper (similar to the flipping steps described above). At this step, the bottom of the food product has two layers of wrapping while the other side has one layer. The food product continues to move along the conveyor until the filling portion and associated wrapper clear the bracket. The length of the mechanism is larger than the length of the wrapper to prevent stoppage of the food product. Once the food product clears the bracket, the mechanism retracts under the conveyor.

Figure 8E:
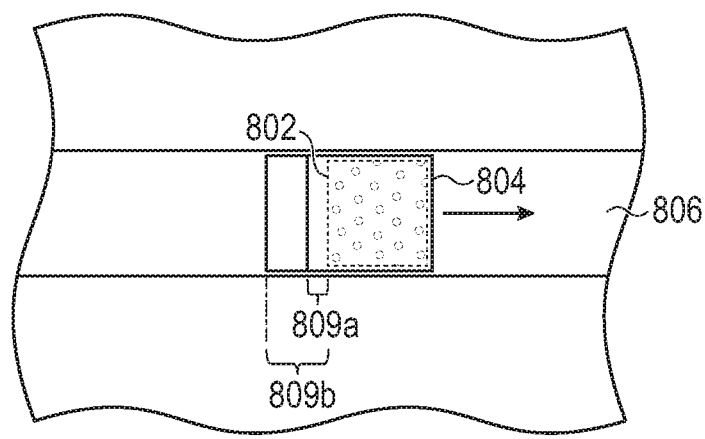

FIG. 8E shows a plan view of FIG. 8D. The filling 802 and the wrapper are within the conveyor and a short segment of the wrapper is not under the filling. Both edges (the leading portion and the trailing portion) are on the back of the filling in the direction of the movement of the conveyor.

FIGS. 9A-9E show the second flipping station. The second flip folds in all parts of the wrapper to the filling and creates a neatly wrapped food product. The second flip ensures at least one layer of the wrapper on the front, back, top, and bottom of the food product to secure the filling within the wrapper and ensures that there is no external seam in the wrapper that exposes filling. The seam runs along the top, bottom, front, and back due to the first flip operation. With the first flip some of the seam is still visible/external along the tail 804b. The second flip internalizes the seam within the food product and ensures no portion of it is on an external surface of the food product. It also ensures the wrapper is double-layered along the bottom of the food product (as defined in the orientation of the FIG. 9A-9D figures). Because all parts of the wrapper fold on the filling and on itself, the food product is more likely to keep its shape during frying, storage, and/or consumption. The additional wrap also helps seal the filling within the wrapper.

After this second flip, the wrapper is folded around the filling and around itself, forming a cuboid shape that generally follows the shape of the filling. The wrapper minimally protrudes from this shape. The second flipping station uses the same type of mechanism as the first flipping station. More specifically, at this station, the remaining trailing portion 904b and the leading portion 904a (which, due to the first flip, is at the top back portion, as shown in FIG. 8A), are folded under the filling 902. This fold takes places as the filling is flipped, using the same motion sequence as the first flip.

As shown in the figures, the second folding station has a prong 920 or a set of prongs that pop up to meet the food product as it rotates the filling 902 onto the wrapper 904 acting as a ramp. A set of guide plates 930 moves towards the wrapper and the filling at the beginning of the station and holds the food product as it flips. The guide plates have, in some examples, a guiding pin 932 that further guides the rotation of the filling. Once the filling is flipped onto itself, the guide plates move away from the conveyor 906, thereby releasing the food product, and the set of prongs 920 retreats under the conveyor. After this flip, the wrapper 904 is tucked under the filling. More specifically, the top of the food product has two layers of wrapper, the bottom of the food product has one layer and two partial layers (from the tucked trailing end and from the leading end), and the right and left sides have a single layer of wrapping.

Figure 9A:
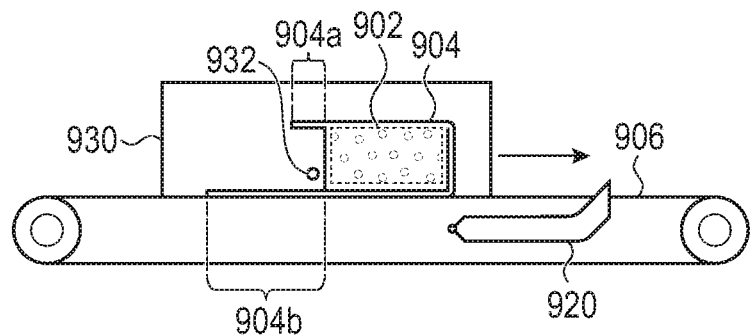
FIGS. 9A-9E depict an example of a flipping station of an example apparatus.
Figure 9B:
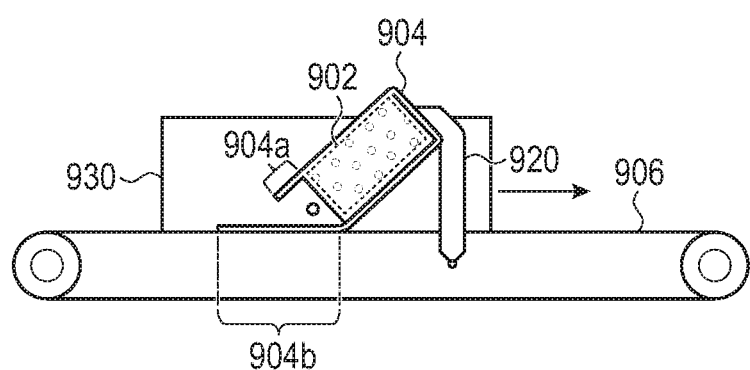
Figure 9C:
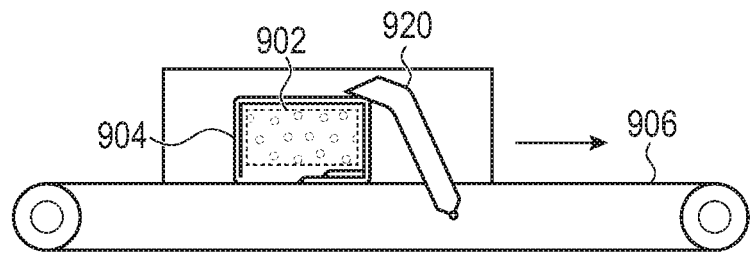
Figure 9D:
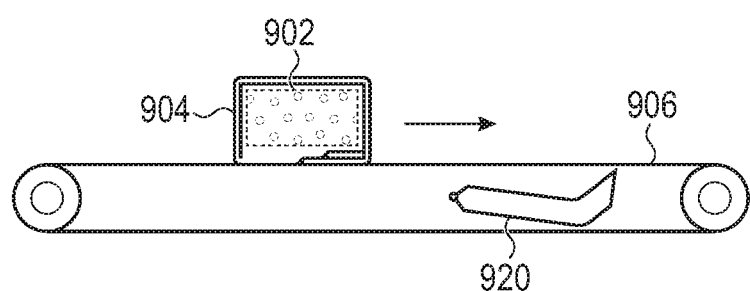
Figure 9E:
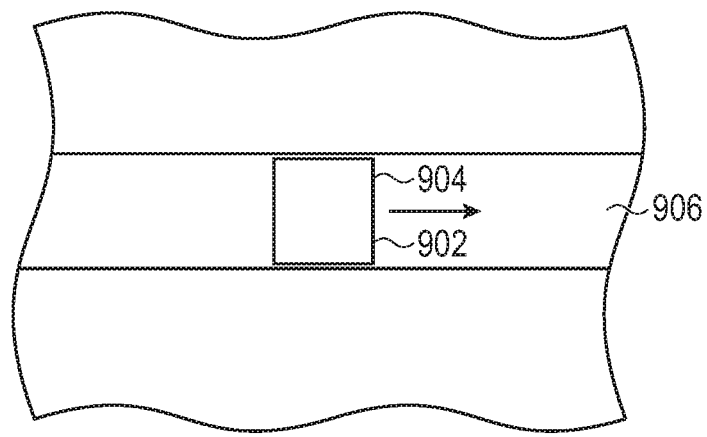

FIG. 9E shows the plan view of FIG. 9D as the food product exits the station. The wrapper 904 follows the general shape of the filling 902, and the wrapper does not protrude from the filling at the top portion of the sides of the food product. The leading edge and the trailing edge wrap around a portion of the bottom of the wrapper.

In some embodiments, the first flipping station and the second flipping station work simultaneously on different food products. This simultaneous operation illustrates the efficient, continuous movement of the apparatus described herein. As explained above, each or some stations have optical sensors that detect the position of the food product as it travels down the conveyor. Based on these sensors, the mechanisms of each or some of the stations are engaged. For example, a sensor coupled to a control system sends a signal to the guide plates to meet the food product at the start of the station. The position of the guide plates is important, particularly in embodiments where the guide plates have guiding pins, because the guide plates are positioned precisely such that the guiding pin abuts or nearly abuts the filling. The coordination of each station with the food product allows the apparatus to operate continuously without stopping or slowing down the conveyor.

Figure 10A:
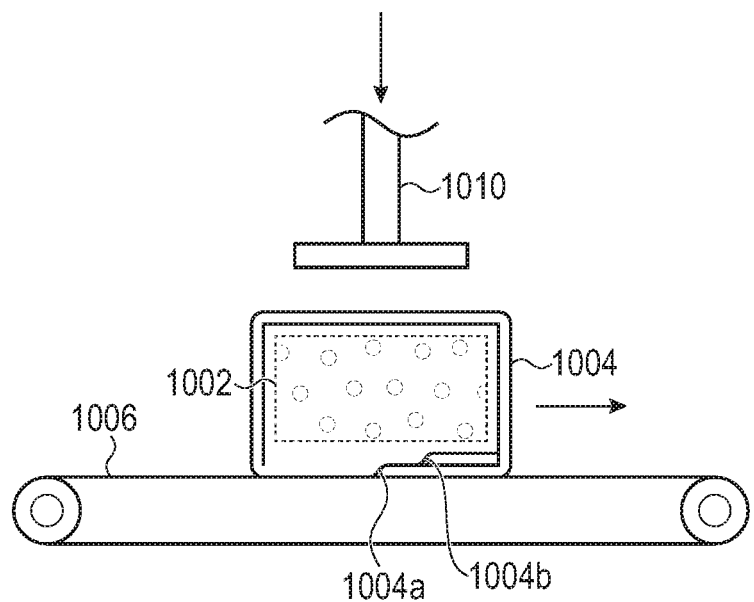
FIGS. 10A-10B depict an example of a stamping station of an example apparatus.
Figure 10B:
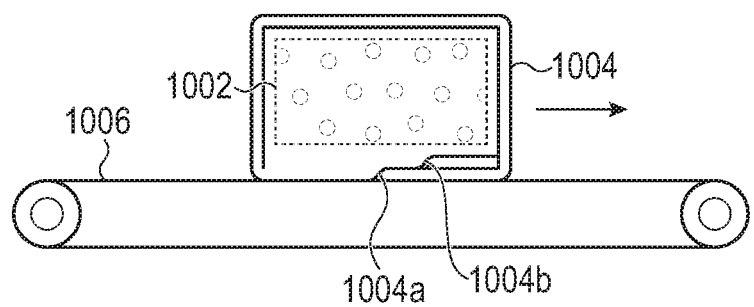

FIGS. 10A-10B illustrate the second stamper station. The station, as shown in FIG. 10A, includes a press 1010 that hovers over the food product (e.g., the filling 1002 and the wrapper 1004) after it is flipped. The press 1010 defines a flat surface that covers at least a portion of the top of the food product. As the product moves with the conveyor, the press lowers, thereby compressing the filling 1002 and the wrapper onto itself. In this configuration, the trailing edge of the wrapper 1004a and the leading edge of the wrapper 1004b are stacked in the bottom portion of the food product. As the press compresses the top portion of the food product, these edges stick onto themselves and set under the filling. The resulting product is a sealed filling that can be stored, fried, baked, and so on. In some embodiments, the apparatus includes additional stations that prepare the food product for consumption or shipping.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An apparatus for making a wrapped food product, the apparatus comprising:
    a conveyor under continuous motion, wherein a wrapper is positioned over the conveyor;
    a filling mechanism, comprising:
        an extruder, conveying a filling from a hopper to a mold; and
        a piston, pushing the filling from the mold to the wrapper;
    a folding mechanism comprising:
        a first plate positioned along a first side of the conveyor, the first plate folding a first side of the wrapper over a first portion of the filling; and
        a second plate positioned along a second side of the conveyor, the second plate folding a second side of the wrapper over a second portion of the filling;
    a stamper positioned over the conveyor, pressing the folded wrapper onto the filling; and
    a flipping mechanism comprising:
        a set of guide plates, aligning the first side and the second side of the folded wrapper with the conveyor; and
        a prong, positioned under the conveyor in a first configuration, rotating the filling and a portion of the wrapper around the filling on itself in a second configuration.

2. The apparatus of claim 1, wherein the extruder is a first extruder, and the apparatus further comprises:
    a drum, comprising:
        a second extruder, extruding a dough product; and
        a heating element, cooking the dough product as a contiguous sheet of dough; and
    a cutter, forming wrappers from the contiguous sheet of dough.

3. The apparatus of claim 1, wherein:
in response to a first position of the wrapper, the set of guide plates moves towards the conveyor and in a direction of movement of the conveyor to abut the wrapper; and
in response to a second position of the wrapper, the set of guide plates move away from the conveyor and in a direction opposite the movement of the conveyor.

4. The apparatus of claim 3, further comprising:
an optical sensor detecting the first position of the wrapper.

5. The apparatus of claim 1, further comprising:
a first mister, positioned upstream of the folding mechanism, spraying a liquid over the wrapper; and
a second mister, positioned upstream of the flipping mechanism, spraying the liquid over the folded wrapper.

6. The apparatus of claim 1, wherein:
the mold receives the filling at a first position away from the conveyor and moves over the conveyor and under the piston in a second position.

7. The apparatus of claim 1, further comprising:
at least one optical sensor communicatively coupled to a control system, the folding mechanism engages in response to a signal from the at least one optical sensor.

8. An apparatus for making a wrapped food item having a filling wrapped in an edible wrapper, the apparatus comprising:
a conveyor that transports a wrapper;
a filling extruder that positions an edible filling onto the wrapper;
a first folding mechanism that folds a first side of the wrapper in a direction of the filling;
a second folding mechanism that folds a second side of the wrapper over a portion of the first side of the wrapper and in the direction of the filling;
a first stamping mechanism that presses the folded first side of the wrapper and the folded second side of the wrapper against the filling;
a first flipping mechanism, comprising:
  a first guide plate positioned along a first side of the conveyor;
  a second guide plate positioned along a second side of the conveyor; wherein the first guide plate and the second guide plate align a stamped food product; and
  a first prong positioned under the conveyor, wherein the first prong pops up from the conveyor to rotate the stamped food product from a leading edge to a trailing edge in a direction opposite movement of the conveyor and retracts from a conveyor surface after rotation;
a second flipping mechanism, comprising:
  a third guide plate positioned along the first side of the conveyor;
  a fourth guide plate positioned along the second side of the conveyor; wherein the third guide plate and the fourth guide plate align the stamped food product; and
  a second prong positioned within the conveyor, wherein the second prong pops up from the conveyor to rotate the stamped food product from the leading edge to the trailing edge in the direction opposite the movement of the conveyor and retracts from the conveyor surface after the rotation; and
a second stamping mechanism that presses the leading edge and the trailing edge against the filling.

9. The apparatus of claim 8, further comprising:
an extruder that forms a thin film of a dough onto the conveyor;
a heating element that cooks the dough; and
a cutter that cuts the cooked dough into wrappers.

10. The apparatus of claim 8, further comprising:
an optical sensor that detects the wrapper at a first station;
in response to the wrapper detected at the first station, the filling extruder positioning the filling over the wrapper; and
in response to the wrapper not detected at the first station, causing the filling extruder to suppress a positioning motion.

11. The apparatus of claim 10, wherein the optical sensor is a first optical sensor, and the apparatus further comprises:
a second optical sensor that detects the wrapper at a second station; and
in response to the wrapper detected at the second station, engaging the first folding mechanism after a predetermined time based at least in part on a speed of the conveyor.

12. The apparatus of claim 8, wherein the conveyor is under continuous motion.

13. The apparatus of claim 8, wherein:
the first guide plate comprises a first guiding pin;
the second guide plate comprises a second guiding pin;
the first guide plate abuts a first side of the filling;
the second guide plate abuts a second side of the filling; and
each first guiding pin and second guiding pin abuts a back side of the filling.

14. The apparatus of claim 13, wherein:
the first guide plate and the second guide plate are communicatively coupled to a control system; and
in response to a signal comprising a position of the wrapper, the first guide plate and the second guide plate move laterally and abut the wrapper.

15. A method for wrapping a food product, the method comprising:
extruding, onto a wrapper, a filling having a predetermined shape and positioned on a portion of the wrapper within a conveyor;
folding, over a first portion of the filling, a first side of the wrapper;
folding, over a second portion of the filling and over a portion of the folded wrapper, a second side of the wrapper;
pressing a leading portion of the wrapper and a trailing portion of the wrapper around a height of the filling;
flipping, via a flipping mechanism and in a direction opposite movement of the conveyor, the filling and the leading portion of the wrapper over the trailing portion of the wrapper, the flipping mechanism preventing stoppage of the food product;
flipping, in the direction opposite the movement of the conveyor, the filling over the trailing portion of the wrapper and over the leading portion of the wrapper; and
compressing the trailing portion, the leading portion, and the filling.

16. The method of claim 15, comprising:
forming, from cooked dough, the wrapper; and
positioning a central portion of the wrapper on the conveyor.

17. The method of claim 15, comprising:
aligning, during the flipping, the folded wrapper between two guide plates, the two guide plates positioned on opposite sides of the conveyor.

18. The method of claim 17, comprising:

sensing, using optical sensors, a position of the wrapper at a first station; and in response to the sensing of the position of the wrapper, moving the two guide plates to the wrapper.

19. The method of claim 18 comprising:

hydrating, prior to the folding, the wrapper over the conveyor; and hydrating, prior to the flipping, the wrapper over the conveyor.

* * * * *